(12) United States Patent
Gilbert et al.

(10) Patent No.: US 9,720,437 B2
(45) Date of Patent: *Aug. 1, 2017

(54) METHOD AND APPARATUS FOR QUANTUM MECHANICAL ENTANGLEMENT PROTECTION

(71) Applicant: The MITRE Corporation, McLean, VA (US)

(72) Inventors: Gerald N. Gilbert, McLean, VA (US); Jonathan S. Hodges, McLean, VA (US); Stephen Peter Pappas, McLean, VA (US); Yaakov Shmuel Weinstein, McLean, VA (US)

(73) Assignee: The MITRE Corporation, McLean, VA (US)

( * ) Notice: Subject to any disclaimer, the term of this patent is extended or adjusted under 35 U.S.C. 154(b) by 173 days.

This patent is subject to a terminal disclaimer.

(21) Appl. No.: 13/856,213

(22) Filed: Apr. 3, 2013

(65) Prior Publication Data

US 2013/0301094 A1    Nov. 14, 2013

Related U.S. Application Data

(60) Provisional application No. 61/645,381, filed on May 10, 2012.

(51) Int. Cl.
*G06E 3/00*       (2006.01)
*G02F 3/00*       (2006.01)
(Continued)

(52) U.S. Cl.
CPC ............... *G06E 1/00* (2013.01); *B82Y 10/00* (2013.01); *G02F 1/0136* (2013.01);
(Continued)

(58) Field of Classification Search
CPC ....... G06N 99/002; H04L 9/0852; G02F 1/39; G02F 2001/212; G02F 1/3536;
(Continued)

(56) References Cited

U.S. PATENT DOCUMENTS 6,473,719 B1 * 10/2002 Steenblik .................. 702/181
2004/0042715 A1 * 3/2004 Linden et al. ............... 385/31
(Continued)

OTHER PUBLICATIONS

Ling et Al. Absolute Rate of SPDC into single transverse Gaussian modes. CLEO/QELS May 2008, San Jose.*
(Continued)

*Primary Examiner* — Bumsuk Won
*Assistant Examiner* — Collin X Beatty
(74) *Attorney, Agent, or Firm* — Sterne, Kessler, Goldstein & Fox PLLC (57) ABSTRACT

Embodiments of the present invention provide systems and methods to robustly inter-convert between polarization-entangled photon pairs and time-entangled photon pairs, such that produced polarization-entangled photons pairs can be converted into time-entangled photon pairs, stored as time-entangled photon pairs to preserve the entanglement for longer periods of time, and then converted back to polarization-entangled photon pairs when ready for manipulation, processing, and measurement by a quantum application.

25 Claims, 7 Drawing Sheets

(51) Int. Cl.
*G06E 1/00* (2006.01)
*G02F 1/01* (2006.01)
*G02F 1/39* (2006.01)
*G02F 1/355* (2006.01)
*G02F 1/35* (2006.01)
*G11C 13/04* (2006.01)
*H04L 9/08* (2006.01)
*G06N 99/00* (2010.01)
*B82Y 10/00* (2011.01)

(52) U.S. Cl.
CPC .......... *G02F 1/3526* (2013.01); *G02F 1/3551* (2013.01); *G02F 1/39* (2013.01); *G06N 99/002* (2013.01); *G11C 13/04* (2013.01); *G11C 13/048* (2013.01); *H04L 9/0852* (2013.01)

(58) Field of Classification Search
CPC .... G02F 1/0136; G02F 1/3526; G02F 1/3551; G06E 1/00; H01L 33/105; H04J 14/06; Y10S 977/933; B82Y 10/00; G11C 13/04; G11C 13/048
USPC ........ 380/256, 278; 359/107, 108, 326, 330, 359/485.01, 489.08, 577; 977/933; 398/65, 154; 257/E29.168; 356/365; 372/21; 385/16, 100
See application file for complete search history.

(56) References Cited

U.S. PATENT DOCUMENTS

| | | | |
|---|---|---|---|
| 2005/0111665 A1* | 5/2005 | Ichimura et al. | 380/256 |
| 2005/0151093 A1* | 7/2005 | Zaugg | 250/458.1 |
| 2009/0022322 A1* | 1/2009 | Trifonov | 380/278 |
| 2009/0097650 A1* | 4/2009 | Cornwall | 380/256 |
| 2010/0111303 A1* | 5/2010 | Finlayson et al. | 380/256 |
| 2010/0157310 A1* | 6/2010 | Bennett et al. | 356/491 |
| 2010/0309469 A1* | 12/2010 | Kanter et al. | 356/364 |
| 2011/0032532 A1* | 2/2011 | Hirano et al. | 356/491 |
| 2011/0170695 A1* | 7/2011 | Fujiwara et al. | 380/278 |
| 2012/0177201 A1* | 7/2012 | Ayling et al. | 380/278 |
| 2013/0258453 A1* | 10/2013 | Arahira | 359/330 |

OTHER PUBLICATIONS

Hodges et Al. Polarization/Time-bin basis conversion of entangled photons. CLEO Technical Digest OSA 2012.*
Zhang et Al. Generation of 10-Ghz clock sequential time-bin entanglement. Optical Society of America, 2007.*
Reck, Michael Hunter Alexander. Quantum Interferometry with Multiports: Entangled Photons in Optical Fibers. Jul. 1996.*
Marcikic et Al. Time-bin entangled qubits for quantum communication created by femtosecond pulses. Phys Rev A vol. 66, 062308 (2002).*
Pittman et Al. Probabilistic quantum logic operations using polarizing beam splitters. Phys Rev A vol. 64 062311 (2001).*
H. Johnston. Entangled memory is a first. Mar. 6, 2008. http://physicsworld.com/cws/article/news/2008/mar/06/entangled-memory-is-a-first.*
Rikizo Ikuta, Yoshiaki Kusaka, Tsuyoshi Kitano, Hiroshi Kato, Takashi Yamamoto, Masato Koashim, Nobuyuki Imoto. Wide-band quantum interface for visible-totelecommunication wavelength conversion. Nature Communications. Nov. 15, 2011.*
M. Zukowski, A. Zeilinger, M. A. Horne, A. K. Ekert. "Event-ready Detectors" Bell Experiment via Entanglement Swapping. Phys. Rev. Letters vol. 71, No. 26, 27 p. 4287-4290, Dec. 27, 1993.*

* cited by examiner

METHOD AND APPARATUS FOR QUANTUM MECHANICAL ENTANGLEMENT PROTECTION

CROSS-REFERENCE TO RELATED APPLICATION(S)

The present application claims the benefit of U.S. provisional application No. 61/645,381, filed May 10, 2012, which is incorporated herein by reference in its entirety.

The present application is related to U.S. non-provisional application Ser. No. 13/856,218, filed Apr. 3, 2013, entitled "Photonic Quantum Memory," which is incorporated herein by reference in its entirety.

FIELD OF THE INVENTION

The present invention relates generally to quantum mechanical entanglement.

BACKGROUND OF THE INVENTION

Entanglement, a fragile and uniquely quantum mechanical resource, is essential to any process using quantum information, such as computing, communication, and sensing. Theoretically, entanglement can exist in different degrees of freedom or bases. For example, photonic entanglement can theoretically exist in various bases, including polarization, energy, wavelength, and time.

Depending on the quantum application (e.g., quantum storage, measurement, processing, etc.) and/or properties of the physical medium, one basis may be preferable to another. Accordingly, there is a need for systems and methods to convert quantum mechanical entanglement from one quantum mechanical basis to another.

BRIEF SUMMARY OF THE INVENTION

Embodiments of the present invention provide systems and methods to robustly inter-convert between polarization-entangled photon pairs and time-entangled photon pairs, such that produced polarization-entangled photon pairs can be converted into time-entangled photon pairs, stored as time-entangled photon pairs to preserve the entanglement for longer periods of time, and then converted back to polarization-entangled photon pairs when ready for manipulation, processing, and measurement by a quantum application. Embodiments can be extended to photon groups of more than two and to other types of quantum bits.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION THE INVENTION

Entanglement, a fragile and uniquely quantum mechanical resource, is essential to any process using quantum information, such as computing, communication, and sensing. For example, entangled photons are a valuable quantum resource for computation, simulation, and communication, as well as sensing beyond the standard quantum limit.

Figure 1:
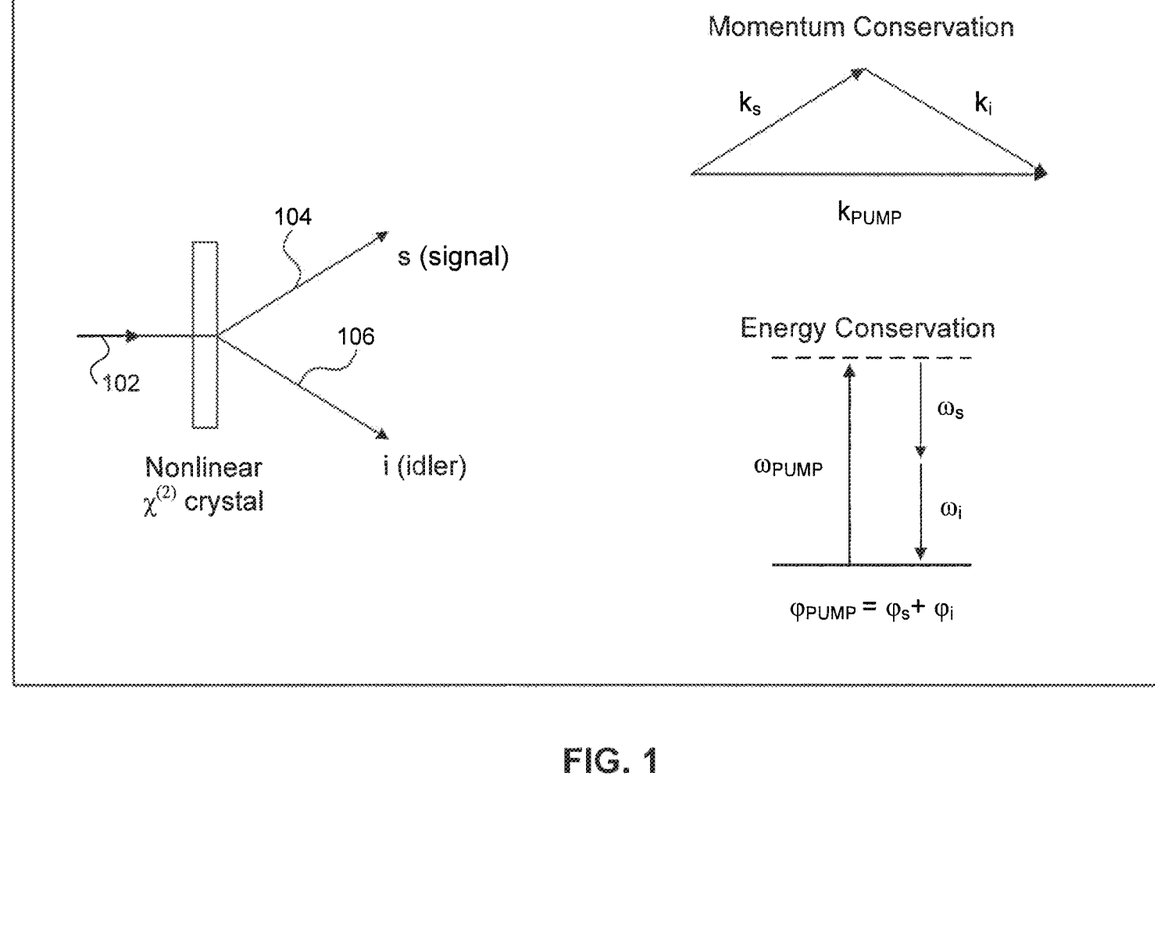
FIG. 1 illustrates a process of photonic entanglement production according to an embodiment of the present invention.

FIG. 1 illustrates a process of photonic entanglement production according to an embodiment of the present invention. The photonic entanglement production process of FIG. 1, known as spontaneous parametric downconversion (SPDC), results in polarization-based photonic entanglement. As shown in FIG. 1, an input laser beam (known as "pump beam") is directed towards a non-linear crystal (e.g., Beta-barium borate (BBO)). The majority of photons of the pump beam do not undergo spontaneous parametric downconversion. At a probabilistically very small (e.g., $10^{-13}$) rate, however, nonlinear optical interaction of the pump beam with the non-linear crystal results in a polarization-entangled photon pair.

For example, in FIG. 1, a photon 102 of the pump beam enters the non-linear crystal and results in two polarization-entangled photons 104 (known as "signal") and 106 (known as "idler"). The central wavelength of photons 104 and 106 (e.g., 800 nm) is twice that of photon 102 (e.g., 400 nm). The process conserves both energy and momentum as shown in FIG. 1.

Polarization-entangled photon pairs exhibit much greater correlation with respect to polarization than can be described in classical mechanics terms. Mathematically, the polarization state of one photon of the entangled-photon pair cannot be described without describing the polarization state of the other photon of the entangled-photon pair.

Photonic entanglement can theoretically exist in many different photonic degrees of freedom (bases), including polarization, energy, wavelength, and time Generally, polarization-based photonic entanglement is desirable because photon polarization is relatively easier to measure than other photonic properties. As such, the polarization-entangled photon pair is today a promising quantum information resource for future quantum computation, simulation, and sensing applications. However, polarization-based photonic entanglement is highly susceptible to birefringence, which severely limits its storage lifetime. Specifically, when photons are stored in a glass medium (e.g., optical fiber loop), the interaction between the glass molecules and the photons results in two different indices of refraction depending on polarization (vertical or horizontal) (which result in vertically-polarized and horizontally-polarized photons traveling at different speeds within the glass medium). This results in a polarization-entangled photon pair (whose entanglement is defined in terms of polarization) quickly losing its entanglement and, consequently, any quantum information is degraded with respect to quantum computational use.

Time-bin (or time-based) photonic entanglement is defined with respect to a time value associated with a photonic wave packet, where the time value may correspond, for example, to the peak of the photonic wave packet. While, in general, time-based photonic entanglement is more difficult to produce initially in a controlled manner than polarization-based entanglement, time-based photonic entanglement is substantially unaffected by birefringence, making it a good qubit candidate for storage. Indeed, despite typical glass imperfections, photons with same polarization all propagate at the speed of light (in glass) in a glass medium and thus maintain their separation in time. As such, a time-entangled photon pair, whose entanglement is defined in terms of the time separation between its two entangled photons, is able to maintain its entanglement much longer than a polarization-entangled photon pair.

Accordingly, there is a need for systems and methods, as provided by embodiments of the present invention, to robustly inter-convert between polarization-entangled photon pairs and time-entangled photon pairs, such that produced polarization-entangled photon pairs can be converted into time-entangled photon pairs, stored as time-entangled photon pairs to preserve the entanglement for longer periods of time, and then converted back to polarization-entangled photon pairs when ready for manipulation, processing, and measurement by a quantum application.

Figure 2:
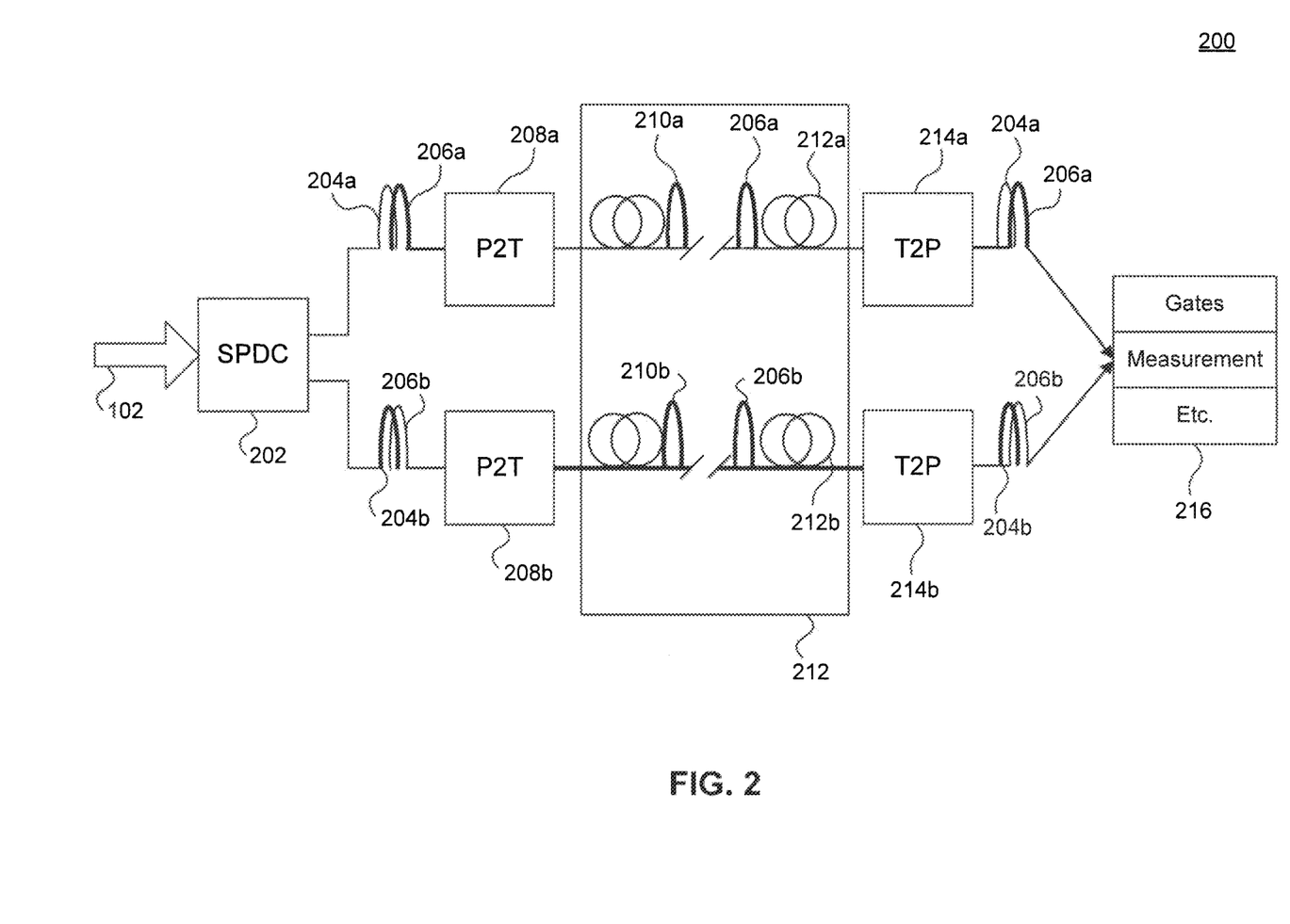
FIG. 2 illustrates an example system according to an embodiment of the present invention.

FIG. 2 illustrates an example system 200 according to an embodiment of the present invention. Example system 200 is provided for the purpose of illustration and is not limiting of embodiments of the present invention. As shown in FIG. 2, example system 200 includes a SPDC source 202, polarization-to-time entanglement conversion (P2T) modules 208a-b, a fiber-optic quantum memory 212, time-to-polarization entanglement (T2P) modules 214a-b, and a quantum computer 216. Quantum memory 212 includes two storage paths 212a and 212b.

As shown in FIG. 2, example system 200 includes two separate paths (each path includes a P2T module, a storage path of quantum memory 212, and a T2P module). The two paths may be fed sequentially by SPDC source 202. Structurally and operationally, the two paths of example system 200 may be identical. According to embodiments, system 200 may include any number of paths, depending on the quantum application requirements. In other embodiments, the paths of example system 200 may not be separate. For example, a P2T/T2P module may be commonly used by two or more paths. In the following, the operation of example system 200 with respect to the top shown path is described. The operation of example system 200 with respect to the bottom shown path should be apparent to a person of shill in the art based on the teachings herein.

SPDC source 202 is configured to receive a pump laser beam 102 and to produce polarization-entangled photon pairs, such as entangled photon pair {204a, 206a}. In an embodiment, SPDC source 202 includes a non-linear crystal configured to produce first and second light outputs from pump laser beam 102, such that the first and second light outputs have orthogonal first and second polarizations (e.g., horizontal and vertical). Further, SPDC source 202 is further configured such that the first and second light outputs intersect at one or more spatial locations giving rise to polarization-entangled photon pairs at the one or more spatial locations. Further description of the first and second light outputs of SPDC 202 is provided in FIG. 3 below.

In an embodiment, SPDC source 202 further includes a filter configured to filter out non-entangled photons of the first and second light outputs, such that the output of SPDC source 202 includes only polarization entangled photon pairs, such as entangled photon pair {204a, 206a}.

Polarization-entangled photon pair {204a, 206a} from SPDC source 202 is fed to P2T module 208a. Within P2T module 208a, the polarization-entangled photon pair {204a, 206a} is converted into a time-entangled photon pair {210a, 206a}. In an embodiment, P2T module 208a converts the entanglement of photon pair {204a, 206a} from the polarization to the time basis. Although the time-entangled photon pair is comprised of the same pair of photons as the polarization-entangled photon pair, it is referred to herein with different reference numerals to reflect the entanglement conversion.

The time-entangled photon pair {210a, 206a} is then stored in a respective storage path 212a of fiber optic quantum memory 212 for as long as needed (and possible without degrading the entanglement fidelity). In an embodiment, quantum memory 212 includes a plurality of fiber optic loops. Because photon pair {210a, 206a} is time-entangled, it can be stored in quantum memory 212 for a relatively long period of time without risk of birefringence.

In an embodiment, when the entangled photon pair {210a, 206a} is ready for use by quantum computer 216, it is converted back by T2P module 214a into a polarization-entangled photon pair {204a, 206a}. The re-converted photon pair {204a, 206a} exhibits the same entanglement properties as the original produced polarization-entangled photon pair {204a, 206a} and is for this reason referred to herein with the same reference numerals. In another embodiment, quantum computer 216 may be capable of using the time-entangled photon pair {210a, 206a} without need for conversion to the polarization basis. Accordingly, the T2P conversion may be eliminated.

Figure 3:
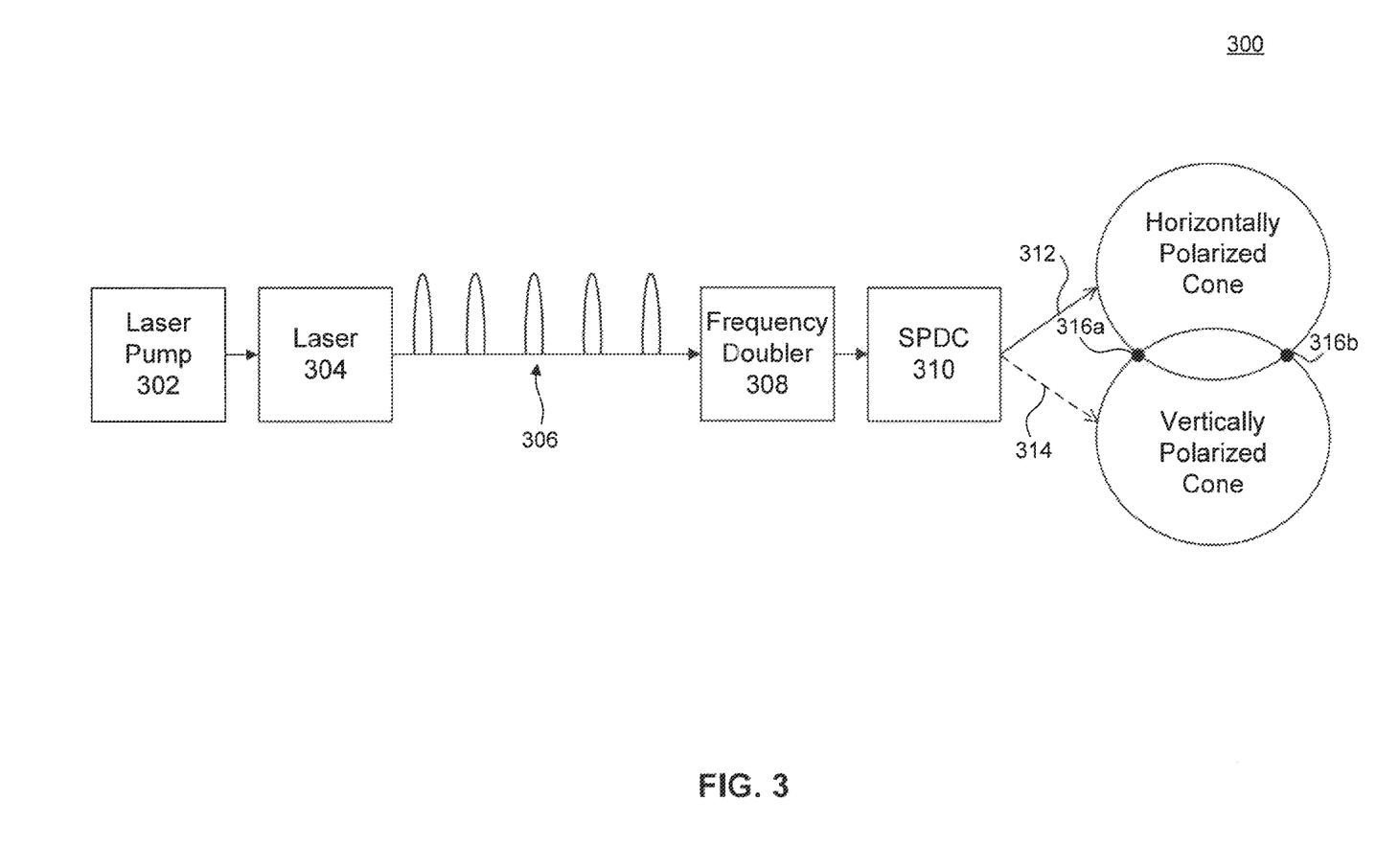
FIG. 3 illustrates an example system for generating polarization-entangled photons according to an embodiment of the present invention.

FIG. 3 illustrates an example system 300 for generating polarization-entangled photons according to an embodiment of the present invention. Example system 300 is provided for the purpose of illustration and is not limiting of embodiments of the present invention. As shown in FIG. 3, example system 300 includes a pump laser 302, a laser 304, a frequency doubler 308, and a SPDC source 310. As would be understood by a person of skill in the art based on the teachings herein, example system 300 may be implemented with more or less components than shown in FIG. 3.

Pump laser 302 is configured to provide energy (e.g., in the form of light or electric current) into a gain medium of laser 304. The energy is provided at an output power higher than a lasing threshold of laser 304. In an embodiment, pump laser 302 is a Verdi® pump laser having a 6.5 Watts output power.

Laser 304 may be a Ti:Sapphire laser, such as the Tsunami® femto-second mode-locked Ti:Sapphire laser, for example. Laser 304 provides configurable output pulse width range, wavelength, and power. In an embodiment, laser 304 is configured to generate a laser pulse train 306 having a pulse length of approximately 150 femtoseconds, a frequency of approximately 80 MHz, and a central wavelength of approximately 800 nm. As would be understood by a person of skill in the art, other types of lasers and/or laser configurations may alternatively be used.

In an embodiment, laser pulse train 306 is input to frequency doubler 308 to double its frequency, before being fed to SPDC 310. Frequency doubler 308 may include a crystal, such as a Lithium Triborate crystal, for example. In another embodiment, pulse train 306 is provided directly to SPDC 310, without passing through frequency doubler 308.

SPDC source 310 may include a non-linear crystal, such as a Beta-Barium. Borate (BBO) crystal. SPDC source 310 is configured to receive laser pulse train 306 and to produce first and second light outputs 312 and 314. In an embodiment, SPDC source 310 is configured such that first and second light outputs 312 and 314 are linearly polarized with orthogonal polarizations (e.g., horizontal and vertical).

In an embodiment, SPDC source 310 is further configured (e.g., through the non-linear crystal, which is cut and configured in a particular way) such that first and second light outputs 312 and 314 each exits SPDC source 310 in a circular shape, creating a cone-like shape (having a circular top base at its end closest to SPDC source 310) as it travels away from SPDC source 310.

Further, SPDC source 310 is configured such that the circular top bases of first and second light outputs 312 and 314 intersect at two spatial locations 316a and 316b, as shown in FIG. 3. As such, each of the spatial locations 316a or 316b is populated by one member of a polarization-entangled pair of photons.

As would be understood by a person of skill in the art based on the teachings herein, embodiments are not limited by the above described example system 300. For example, embodiments may be extended to use any number of SPDC light outputs, different light output shapes, and/or any number of spatial intersection locations, to produce polarization-entangled photon pairs.

In an embodiment, SPDC source 310 performs a first order SPDC process when it produces polarization-entangled photon pairs. The general form of the wavefunction resulting from the first order SPDC process contains a two photon entanglement correlation:

$$|\psi_p\rangle = \int d\omega_1 \int d\kappa_1 \int d\omega_2 \int d\kappa_2 \Phi(\omega_1,\kappa_1,\omega_2,\kappa_2) \hat{a}_{\kappa_1,\epsilon_2}{}^+(\omega_1) \hat{a}_{\kappa_2,\epsilon_2}{}^+(\omega_2)|0\rangle \quad (1)$$

where $\hat{a}^+$ is the bosonic creation operator for a photon into spatial mode k with polarization $\epsilon$ and energy $\hbar\omega$; and $|0\rangle$ is the vacuum state. The factor $\Phi$ sets the quantum amplitudes and contains the phase matching and time-energy conditions for a pulsed pump field. For degenerate, non-collinear type-II SPDC, the two photons are orthogonally polarized with equal and opposite k, which we define as modes â and b̂. The state has only polarization entanglement:

$$|\psi_+\rangle = \frac{1}{\sqrt{2}}(\hat{a}_H(t)\hat{b}_V(t) + \hat{a}_V(t)\hat{b}_H(t))|0\rangle,$$

where V and H denote vertical and horizontal polarization of the photons.

Figure 4:
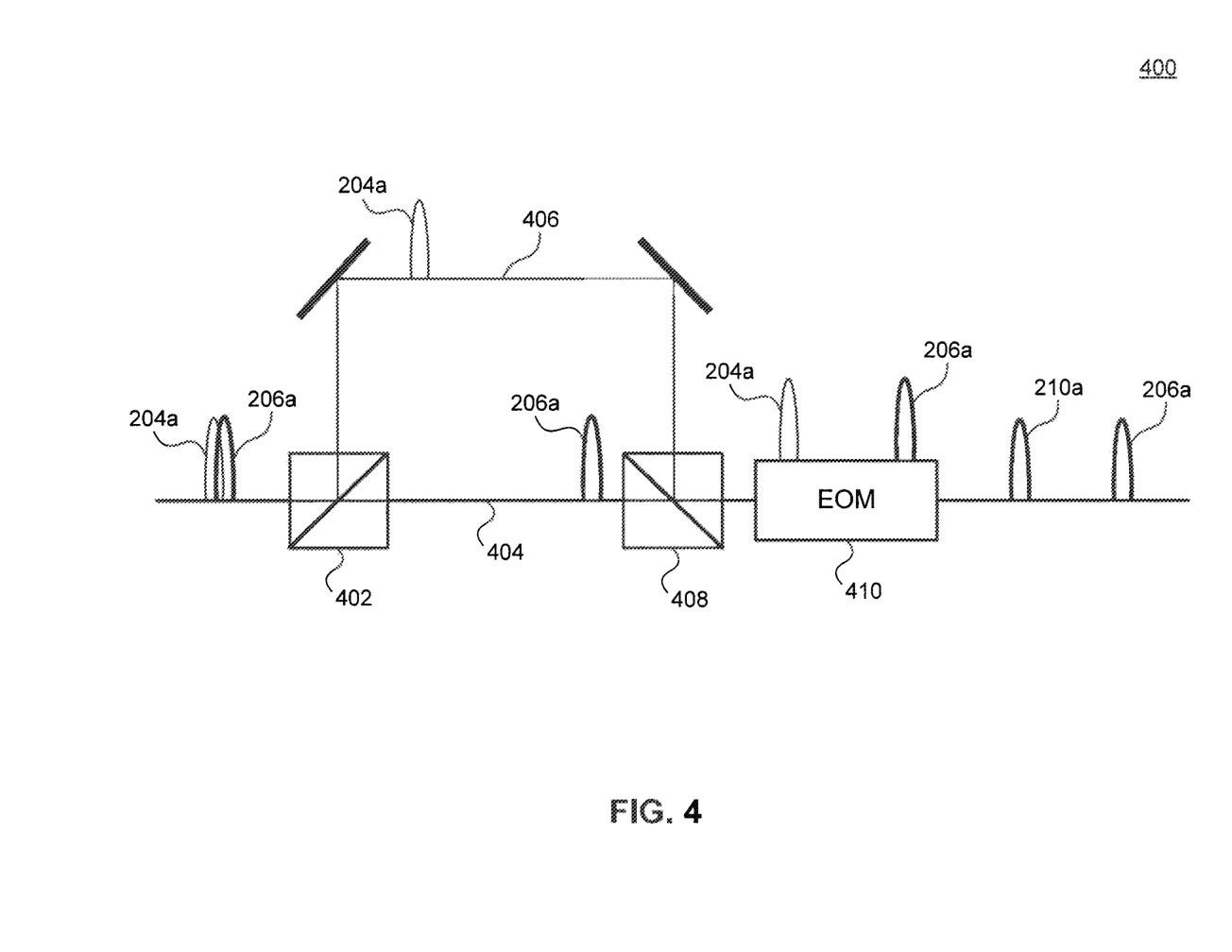
FIG. 4 illustrates an example system for converting polarization-entangled photons to time-entangled photons according to an embodiment of the present invention.

FIG. 4 illustrates an example system 400 for converting polarization-entangled photons to time-entangled photons according to an embodiment of the present invention. Example system 400 is provided for the purpose of illustration and is not limiting of embodiments of the present invention. Example system 400 may be an embodiment of P2T module 208 described above with reference to FIG. 2. As shown in FIG. 4, example system 400 includes a first polarizing beam splitter (PBS) 402, a first fiber optic path 404, a second fiber optic path 406, a second PBS 408, and an electro-optic modulator (EOM) 410.

In an embodiment, first PBS 402, first path 404, second path 406, and second PBS 408 are comprised in a first module, such as an imbalanced polarizing Mach-Zehnder interferometer (MZI), for example. The first module is configured to receive a polarization-entangled photon pair {204a, 206a}, which as shown in FIG. 4 includes time-coincident first and second photons 206a and 204a. In an embodiment, first and second photons 206a and 204a have first and second polarizations, respectively.

First PBS 402 is configured to split the time-coincident first and second photons 206a and 204a, and to direct the first photon 206a on first path 404 and second photon 204a on second path 406. In an embodiment, first path 404 is shorter than second path 406. As such, when first and second photons 206a and 204a are re-combined by second PBS 408 on a common path at the output of the first module (e.g., MZI), the two photons are time-separated as shown in FIG. 4. In an embodiment, second photon 204a is delayed relative to first photon 206a by the time it takes a photo is wave packet to traverse the length difference between first and second paths 404 and 406. The first and second photons 206a and 204a continue to have the same first and second polarizations, respectively, at the output of the first module.

In an embodiment, the wavefunction of the photon pair exiting the first module (e.g., MZI) exhibits entanglement spread between polarization and time-bin degrees of freedom, which can be written as:

$$|\psi'_+\rangle = \frac{1}{\sqrt{2}}(\hat{a}_H^+(t+\tau_1)\hat{b}_V^+(t+\tau_2) + \hat{a}_V^+(t+\tau_1)\hat{b}_H^+(t+\tau_2))|0\rangle. \quad (2)$$

In an embodiment, the length difference between first and second paths 404 and 406 is configured based on the capacity of a quantum memory (e.g., fiber-optic quantum memory 212) used to store the output of example system 400 and/or the detection rate of a detection system attached to the memory. For example, when photons from example system 400 are stored in a fiber optic loop, the photons need to be input at a rate that 1) does not result in successive photons overlapping with one another within the loop and 2) does not overwhelm the detection system when being read from the memory.

EOM 410 is configured to receive the time-separated first and second photons 206a and 204a (in the time order shown in FIG. 4) and to adjust at least one of the first polarization of the first photon 206a and the second polarization of the second photon 204a to produce a tune-entangled photon pair {206a, 210a}. The time-entangled photon pair {206a, 210a} comprises time-shifted first and second photons 206a and 210a, each having a third polarization.

In an embodiment, EOM 410 transfers the entanglement of the time-separated first and second photons 206a and 204a solely to the time basis by applying a time-dependent polarization shift. In the limit that $|\tau_2-\tau_1|$ is within the EOM switching time, EOM 410 rotate the polarization by +45° for $\tau_1$ and −45° for $\tau_2$. The spatial mode of the bi-photon wavepacket exiting EOM 410 will have definite polarization and purely time-bin entanglement, which can be written as:

$$|\psi'\rangle = \frac{1}{\sqrt{2}}\begin{pmatrix}\hat{a}_{+45}^+(t+\tau_1)\hat{b}_{+45}^+(t+\tau_2) + \\ \hat{a}_{+45}^+(t+\tau_2)\hat{b}_{+45}^+(t+\tau_1)\end{pmatrix}|0\rangle \quad (3)$$

$$\equiv \frac{1}{\sqrt{2}}(|\tau_1, \tau_2\rangle + |\tau_2, \tau_1\rangle)$$

EOM 410 may include a non-linear optical material, such a Lithium Niobate crystal, for example. In an embodiment, EOM 410 is configured to receive an electric (e.g., voltage) pulse and to apply a polarization shift in accordance with an amplitude of the electric pulse. The electric pulse may be configured to repeat at a period equal to a time separation between the time-separated first and second photons 206a and 204a. Thus, EOM 410 acts on both photons 206a and 204a. In other embodiments, EOM 410 may be replaced with other equivalent optical modules capable of modulating tight to adjust polarization.

The third polarization of the time-entangled photon pair {206a, 210a} may be equal to the first polarization or the second polarization, or different from either the first and second polarization. In the embodiment shown in FIG. 4, EOM 410 acts on the second photon 204a only, changing its polarization from the second polarization to the first polarization and resulting in photon 210a. In another embodiment, EOM 410 acts on both first and second photons 206a and 204a, adjusting their polarizations to become equal. In an embodiment, EOM 410 is configured to adjust the first polarization of the first photon 206a by +45 degrees and the second polarization of the second photon 204a by −45 degrees.

Figure 5:
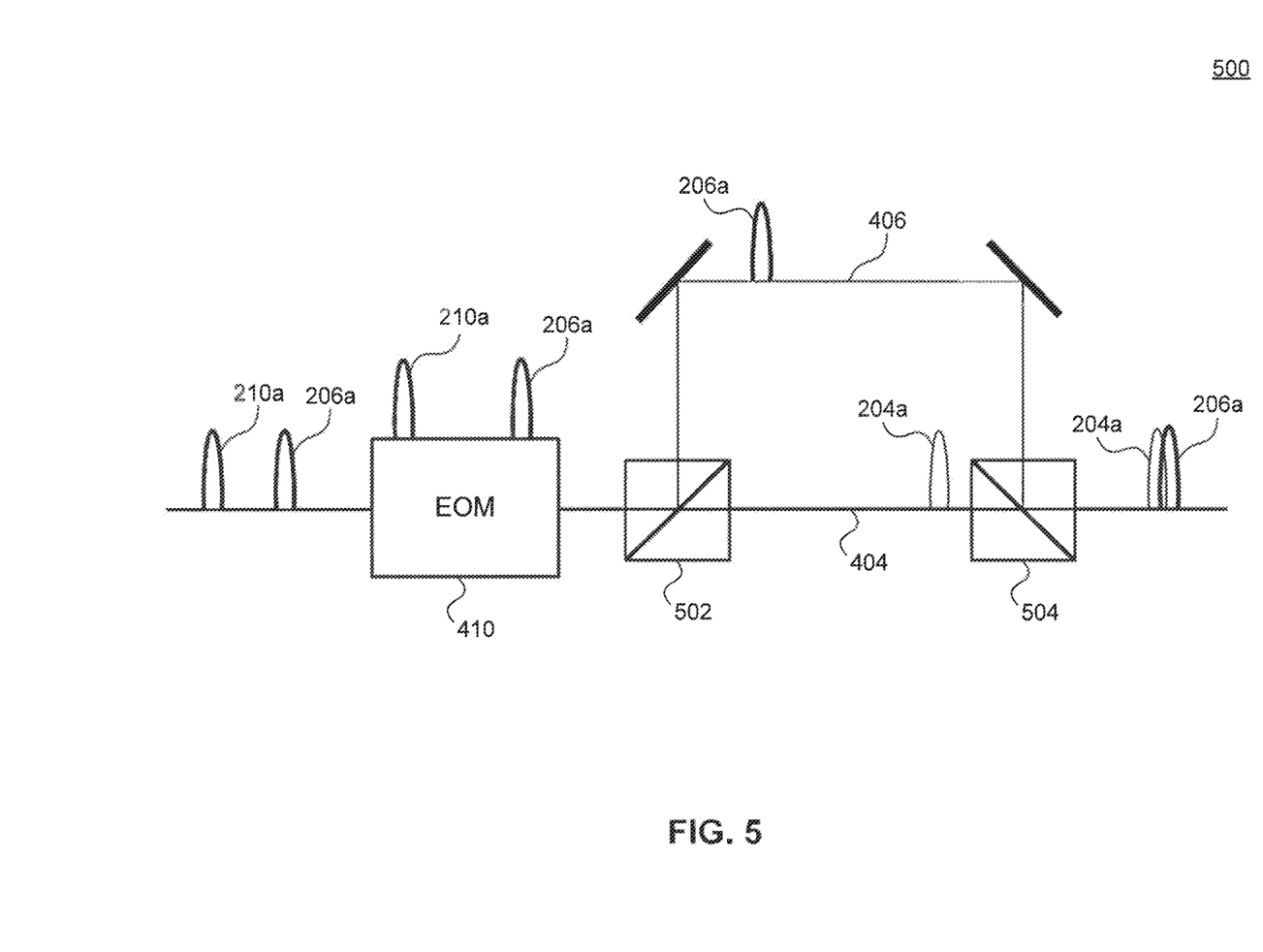
FIG. 5 illustrates an example system for converting time-entangled photons to polarization-entangled photons according to an embodiment of the present invention.

FIG. 5 illustrates an example system 500 for converting time-entangled photons to polarization-entangled photons according to an embodiment of the present invention. Example system 500 is provided for the purpose of illustration and is not limiting of embodiments of the present invention. Example system 500 may be an embodiment of T2P module 214 described above with reference to FIG. 2.

As shown in FIG. 5, example system 500 is a mirror-image of example system 400 and serves to perform the reverse process. Specifically, example system 500 includes a first polarizing beam splitter (PBS) 502, a first fiber optic path 404, a second fiber optic path 406, a second PBS 504, and an EOM 410.

A time-entangled photon pair {206a, 210a}, including time-shifted first and second photons 206a and 210a (with equal polarization), is received by EOM 410, EOM 410 acts on second photon 210a, adjusting its polarization such that it becomes orthogonal to the polarization of first photon 206a. PBS 502 receives first photon 206a and the second photon, now 204a, in the order Shown, and directs first photon 206a on second path 406 and second photon 204a on first path 404. First and second paths 404 and 406 are configured such that first and second photons 206a and 204a time-coincide when re-combined on a common path by second PBS 504, resulting in a polarization-entangled photon {204a, 206a}.

Figure 6:
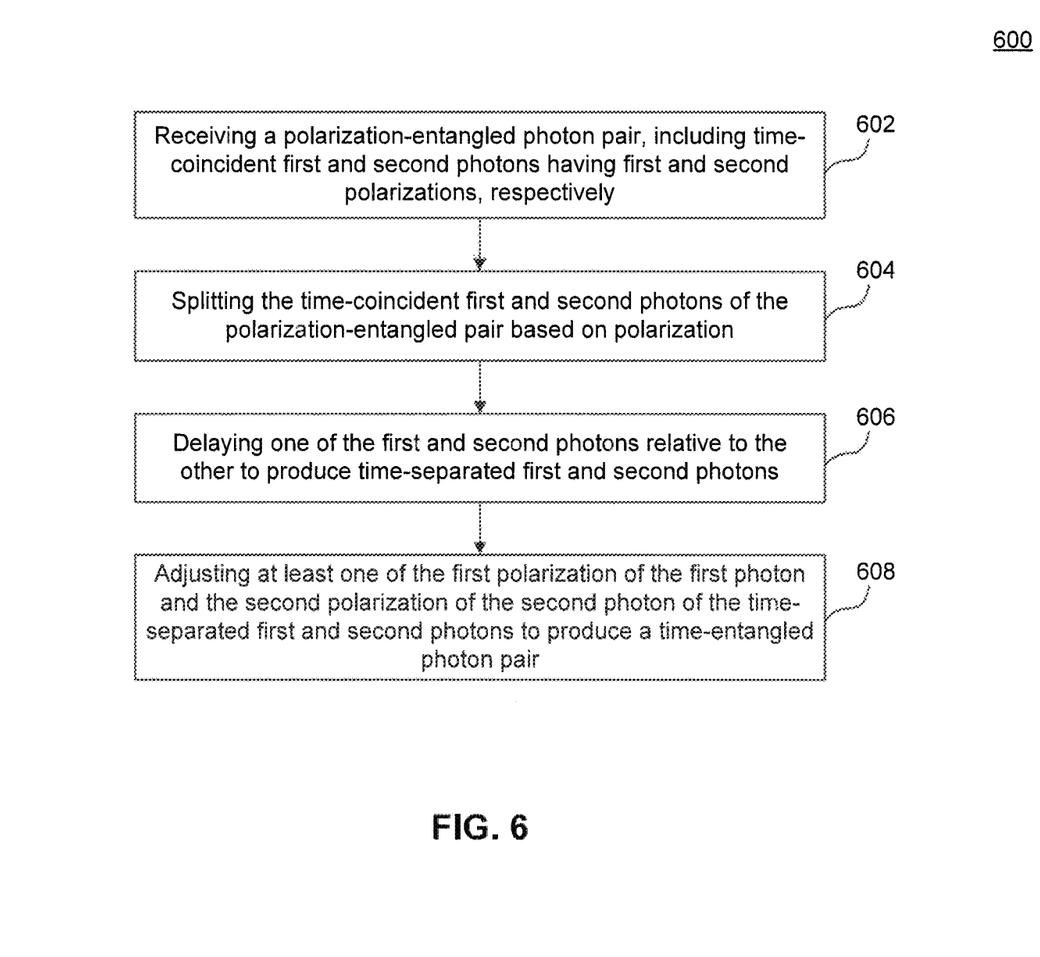
FIG. 6 is a process flowchart of a method according to an embodiment of the present invention.

FIG. 6 is a process flowchart 600 of a method according to an embodiment of the present invention. Process 600 may be performed by a system like example system 200, for example.

As shown in FIG. 6, process 600 begins in step 602, which includes receiving a polarization-entangled photon pair, where the polarization-entangled photon pair includes time-coincident first and second photons having first and second polarizations, respectively.

In an embodiment, the polarization-entangled photon pair is produced using a SPDC source, such as SPDC source 202. For example, the polarization-entangled photon pair is produced by directing a laser beam at a non-linear crystal. The non-linear crystal is configured to produce first and second circularly-shaped light outputs having first and second polarizations (e.g., horizontal and vertical), respectively, and that intersect at two correlated spatial locations. The polarization-entangled photon pair corresponds to a photon of the first light output being polarization-entangled with a photon of the second light output, with the two photons located at the two correlated spatial locations of intersection (each photon located at one of the two spatial locations).

As would be understood by a person of skill in the art based on the teachings herein, embodiments are not limited by the above described example process for producing the polarization-entangled photon pair. Other processes for producing the polarization-entangled photon pair may be used, including processes that use different crystal types and that generates light outputs with different characteristics than described (e.g., different light output shape, different number of light outputs, different number of spatial locations of intersection, etc.).

In an embodiment, producing the polarization-entangled photon pair further includes filtering the first and second light outputs to eliminate non-entangled photons of the first and second light outputs and only keep polarization-entangled photons.

Returning to process 600, in step 604, process 600 includes splitting the time-coincident first and second photons of the polarization-entangled photon pair based on polarization. In an embodiment, step 604 is performed using a PBS, such as PBS 402, which directs the first photon having the first polarization onto a first optical path and the second photon having the second polarization onto a second optical path.

Subsequently, step 606 includes delaying one of the first and second photons relative to the other to produce time-separated first and second photons. In an embodiment, step 606 is performed by directing the first and second photons onto respective paths of different lengths, and then re-combining the two photons on the same common path. Because of the different path lengths, when re-combined, the first and second photons will be time-separated by the time it takes a photonic wave packet to traverse the length difference between the respective paths. The first and second photons continue to have the first and second polarizations, respectively.

Finally, process 600 terminates in step 608, which includes adjusting at least one of the first polarization of the first photon and the second polarization of the second photon of the time-separated first and second photons to produce a time-entangled photon pair, where the time-entangled photon pair comprises time-shifted first and second photons each having a third polarization.

In an embodiment, step 608 includes adjusting either the first polarization of the first photon or the second polarization of the second photon, such that the third polarization is equal to either the second polarization or the first polarization. In another embodiment, step 608 includes adjusting both the first polarization of the first photon and the second polarization of the second photon, such that the third polarization is not equal to either the first polarization of the second polarization. For example, in an embodiment, step 608 includes adjusting the first polarization of the first photon by +45 degrees and the second polarization of the second photon by −45 degrees.

In an embodiment, step 608 is performed by an EOM, such as 410. The EOM is acted upon by a periodic electric pulse having a period equal to the time separation introduced between the first and second photons in step 606. The EOM applies an appropriate phase shift in accordance with an amplitude of the electric pulse.

The time-entangled photon pair produced in step 608 may be stored, in an embodiment, in a fiber optic quantum memory (e.g., fiber optic loop). Photonic entanglement is better preserved (e.g., against birefringence and polarization-induced decoherence) in the time basis than in the polarization basis, and thus the time-entangled photon pair can be stored for a relatively long period of time. When the information carried by the photonic entanglement is ready for use, the time-entangled photon pair is converted back to a polarization-entangled photon pair in an embodiment. This may be done when photonic entanglement is easier to measure ire the polarization basis than in the time basis. The polarization-entangled photon pair can then be used as a computation resource in a quantum computer, for example. Alternatively, the time-entangled photon pair is used directly by the quantum computer, without conversion to the polarization basis.

As would be understood by a person of skill in the art based on the teachings herein, embodiments can be extended to quantum applications with entanglement defined over any number of photons (i.e., not only a pair). For example, in a similar manner as described above, polarization-entangled groups of photons can have their entanglement converted to the time basis, stored, and then converted back to the polarization basis.

While embodiments of the present invention have been described above with photons as the quantum bit (qubit), embodiments can be extended to other types of qubits, including, for example and without limitation, ions, electrons, quantum dots, nuclear magnetic resonance (NMR) states, super-conducting loops, etc. In an embodiment, each of these qubits is a two-state system, characterized by one or more binary function valued (can have one of two values) feature or property (basis), with respect to which qubit pair entanglement can occur. An entangled quantum bit pair can be produced in a first quantum mechanical basis and then optionally converted to a second quantum mechanical basis. As would be understood by a person of skill in the art based on the teachings herein, the first and second quantum mechanical bases may differ from one type of qubit to another.

Figure 7:
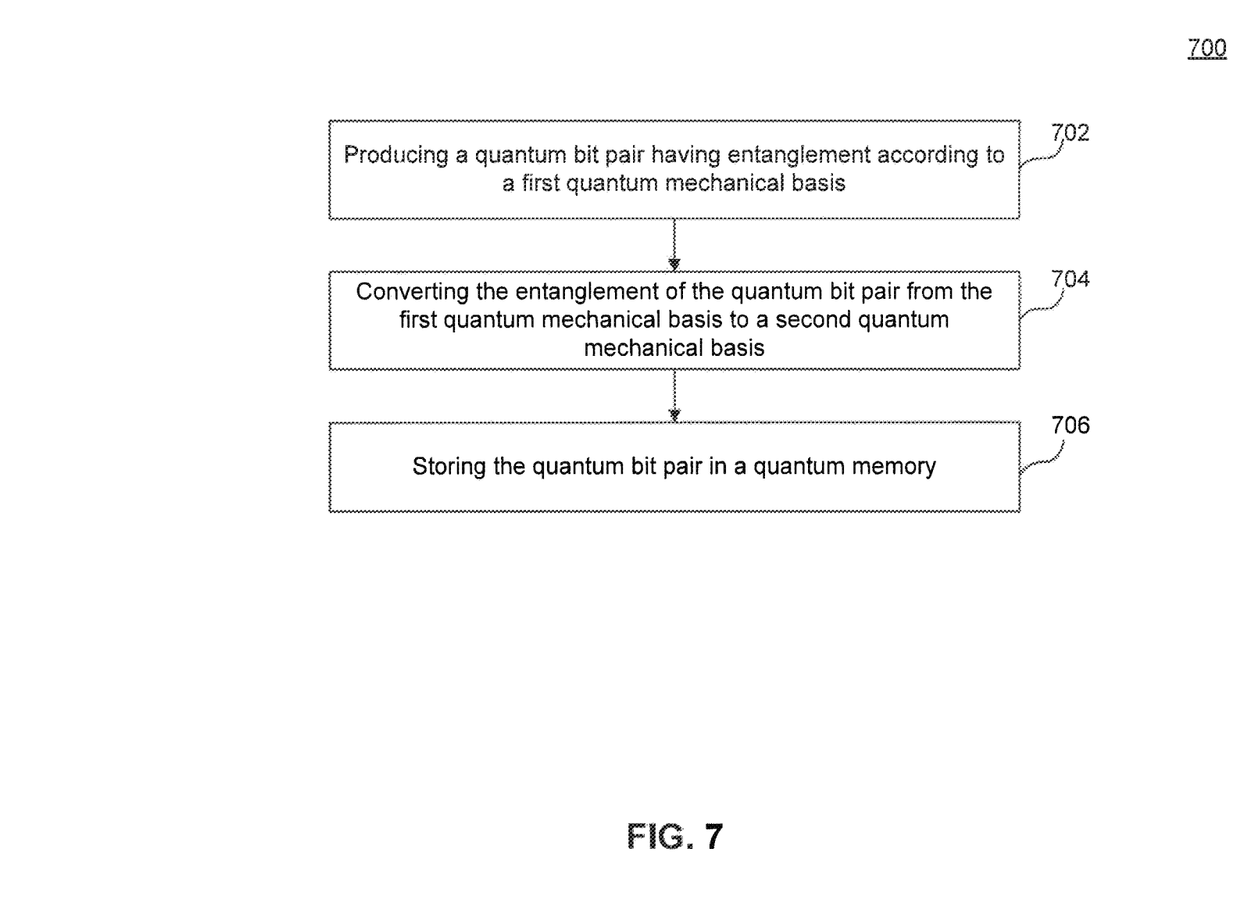
FIG. 7 is a process flowchart of a method according to an embodiment of the present invention.

FIG. 7 is a process flowchart 700 of a method according to an embodiment of the present invention. As shown in FIG. 7, process 700 begins in step 702, which includes producing a quantum bit pair having entanglement according to a first quantum mechanical basis. Step 702 may be performed using a similar process or system as described above with respect to FIG. 3, tailored to the particular quantum bit used. In general, quantum particles are made of either bosons (e.g., light is made of bosons and the boson creation operator is used to described it) or fermions (e.g., electricity is made of fermions and the fermion creation operator is used to described them). Generally, therefore, a person of skill in the art would appreciate that Equations (1)-(3) described above can be extended to other types of quantum bits simply by modifying the "creation operator" that identifies the quantum particle described.

Subsequently, process 700 includes, in step 704, converting the entanglement of the quantum bit pair from the first quantum mechanical basis to a second quantum mechanical basis. The choice of the first and second quantum mechanical bases (when more than two are available) depends, among other factors, on the qubit type, the quantum storage medium, and the quantum computing medium. In an embodiment, step 704 is performed because the entanglement of the quantum bit pair is better preserved over time in the second quantum mechanical basis than in the first quantum mechanical basis. For example, the entanglement of the quantum bit pair may be less susceptible to birefringence (in the case of photons for example) (or decoherence, in the case of other types of qubits) in the second quantum mechanical basis than in the first quantum mechanical basis.

The quantum bit pair, entangled in the second quantum mechanical basis, is then stored in a quantum memory in step 706. When the quantum bit pair is ready for use, the quantum bit pair may be subsequently converted back from the second quantum mechanical basis to the first quantum mechanical basis. In an embodiment, the conversion is done because the entanglement of the quantum bit pair is easier to measure in the first quantum mechanical basis than in the second quantum mechanical basis.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
    a first module configured to receive a polarization-entangled photon pair from a parametric down-conversion source, the polarization-entangled photon pair comprising time-coincident first and second photons having first and second polarizations respectively, and to produce time-separated first and second photons having the first and second polarizations respectively;
    a second module configured to receive the time-separated first and second photons and to adjust at least one of the first polarization of the first photon and the second polarization of the second photon to produce a time-entangled photon pair, the time-entangled photon pair comprising time-shifted first and second photons each having a third polarization;
    a fiber optic quantum memory configured to store the time-entangled photon pair and to maintain an entanglement fidelity of the time-entangled photon pair; and
    a third module configured to convert the time-entangled photon pair to the polarization-entangled photon pair to be used by a computing device.

2. The system of claim 1, wherein the first module comprises:
    a first polarizing beam splitter (PBS) configured to receive and split the time-coincident first and second photons;
    a first path, coupled to the first PBS, configured to receive the first photon of the time-coincident first and second photons;
    a second path, coupled to the first PBS, configured to receive the second photon of the time-coincident first and second photons; and
    another PBS, coupled to the first and second paths, configured to combine the first and second photons to produce the time-separated first and second photons.

3. The system of claim 2, wherein the first and second paths have first and second lengths respectively, and wherein the first length is shorter than the second length.

4. The system of claim 1, wherein the first module comprises an imbalanced polarizing Mach-Zehnder interferometer.

5. The system of claim 1, wherein the second module is further configured to adjust the first polarization of the first photon by +45 degrees and the second polarization of the second photon by −45 degrees.

6. The system of claim 1, wherein the third polarization is equal to one of the first polarization and the second polarization.

7. The system of claim 1, wherein the second module comprises an electro-optic modulator (EOM).

8. The system of claim 7, wherein the EOM is configured to receive an electric pulse and to apply a polarization shift in accordance with an amplitude of the electric pulse.

9. The system of claim 8, wherein the electric pulse is configured to repeat at a period equal to a time separation between the time-separated first and second photons.

10. The system of claim 1, wherein the parametric down-conversion source comprises a spontaneous parametric down-conversion (SPDC) source configured to produce the polarization-entangled photon pair.

11. The system of claim 10, wherein the SPDC source comprises:
a non-linear crystal configured to receive a laser beam and to produce first and second light outputs having the first and second polarizations, respectively.

12. The system of claim 11, wherein the non-linear crystal is further configured such that the first and second light outputs are each circular in shape and intersect at two spatial locations, and wherein the polarization-entangled photon pair corresponds to a photon of the first light output being polarization-entangled with a photon of the second light output, and wherein the photon of the first light output is located at a first one of the two spatial locations and the photon of the second light output is located at a second one of the two spatial locations.

13. The system of claim 12, wherein the SPDC source comprises a filter configured to filter out non-entangled photons of the first and second light outputs.

14. The system of claim 11, wherein the non-linear crystal is Beta-Barium Borate crystal.

15. The system of claim 1, wherein the computing device comprises a quantum computer configured to utilize the polarization-entangled photon pair as a computational resource.

16. A method comprising:
receiving a polarization-entangled photon pair from a parametric down-conversion source, the polarization-entangled photon pair comprising time-coincident first and second photons having first and second polarizations respectively;
splitting, with a polarizing beam splitter, the time-coincident first and second photons based on polarization;
delaying one of the first and second photons relative to the other to produce time-separated first and second photons having the first and second polarizations respectively;
adjusting at least one of the first polarization of the first photon and the second polarization of the second photon of the time-separated first and second photons to produce a time-entangled photon pair, the time-entangled photon pair comprising time-shifted first and second photons each having a third polarization;
storing the time-entangled photon pair in a fiber optic quantum memory; and
converting the time-entangled photon pair to the polarization-entangled photon pair to be used in a computing device.

17. The method of claim 16, wherein the adjusting comprises adjusting the first polarization of the first photon by +45 degrees and the second polarization of the second photon by −45 degrees.

18. The method of claim 16, wherein the third polarization is equal to one of the first polarization and the second polarization.

19. The method of claim 16, further comprising:
directing a laser beam at a non-linear crystal to produce first and second light outputs having the first and second polarizations, respectively, and wherein the first and second light outputs are each circular in shape and intersect at two spatial locations; and
filtering the first and second light outputs to produce the polarization-entangled photon pair, wherein the polarization-entangled photon pair corresponds to a photon of the first light output being polarization-entangled with a photon of the second light output, and wherein the photon of the first light output is located at a first one of the two spatial locations and the photon of the second light output is located at a second one of the two spatial locations.

20. The method of claim 16, wherein the converting comprises using the polarization-entangled photon pair as a computational resource in the computing device, wherein the computing device comprises a quantum computer.

21. A method comprising:
producing a quantum bit pair having entanglement according to a first quantum mechanical basis;
converting the entanglement of the quantum bit pair from the first quantum mechanical basis to a second quantum mechanical basis, wherein the entanglement of the quantum bit pair is better preserved over time in the second quantum mechanical basis than in the first quantum mechanical basis;
adjusting a polarization of the quantum bit pair in the second quantum mechanical basis;
storing the quantum bit pair in a fiber optic quantum memory to preserve the quantum bit pair in the second quantum mechanical basis; and
converting the entanglement of the quantum bit pair from the second quantum mechanical basis to the first quantum mechanical basis to be used in a computing device.

22. The method of claim 21, wherein the entanglement of the quantum bit pair is less susceptible to birefringence in the second quantum mechanical basis than in the first quantum mechanical basis.

23. The method of claim 21, wherein the converting comprises using the quantum bit pair as a computational resource in the computing device, wherein the computing device comprises a quantum computer.

24. The method of claim 21, further comprising:
measuring the entanglement of the quantum bit pair in the first quantum mechanical basis rather than the second quantum mechanical basis.

25. The system of claim 1, wherein the first module is configured to separate the first and second photons based on a length difference between a first path and a second path in the first module.

* * * * *